D. McF. MOORE.
VACUUM TUBE LAMP.
APPLICATION FILED JAN. 5, 1905.
1,046,004.
Patented Dec. 3, 1912.
3 SHEETS—SHEET 2.
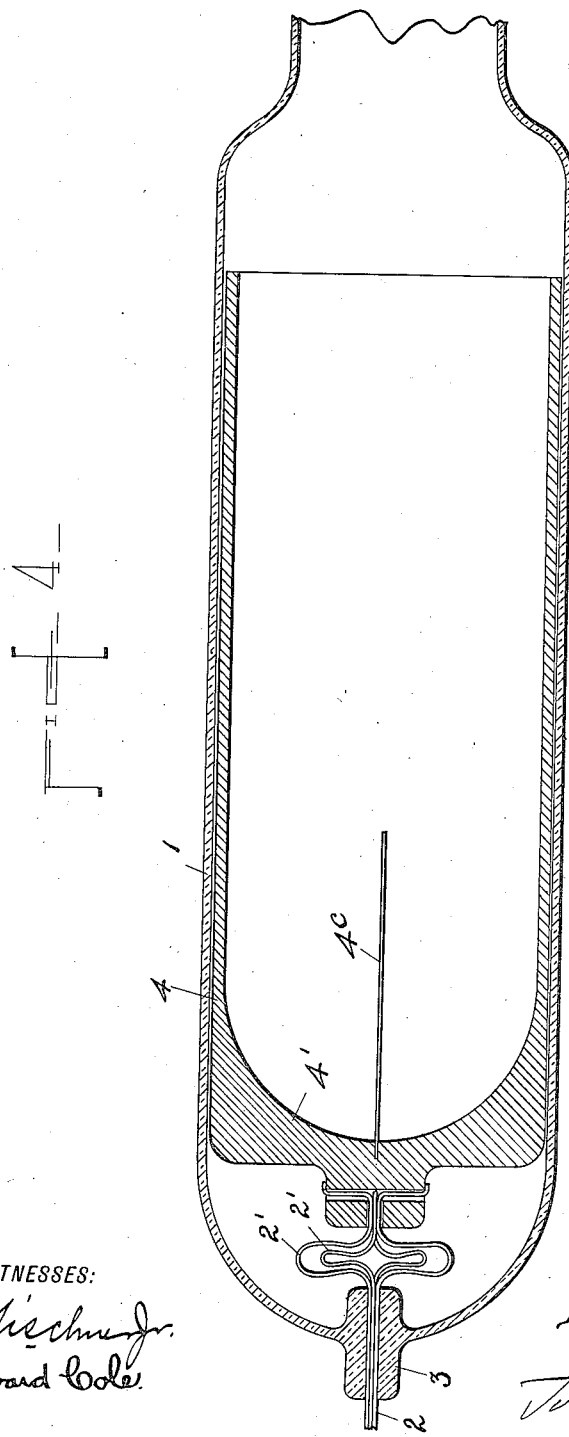
WITNESSES:
INVENTOR
Daniel McFarlan Moore
BY
ATTORNEY

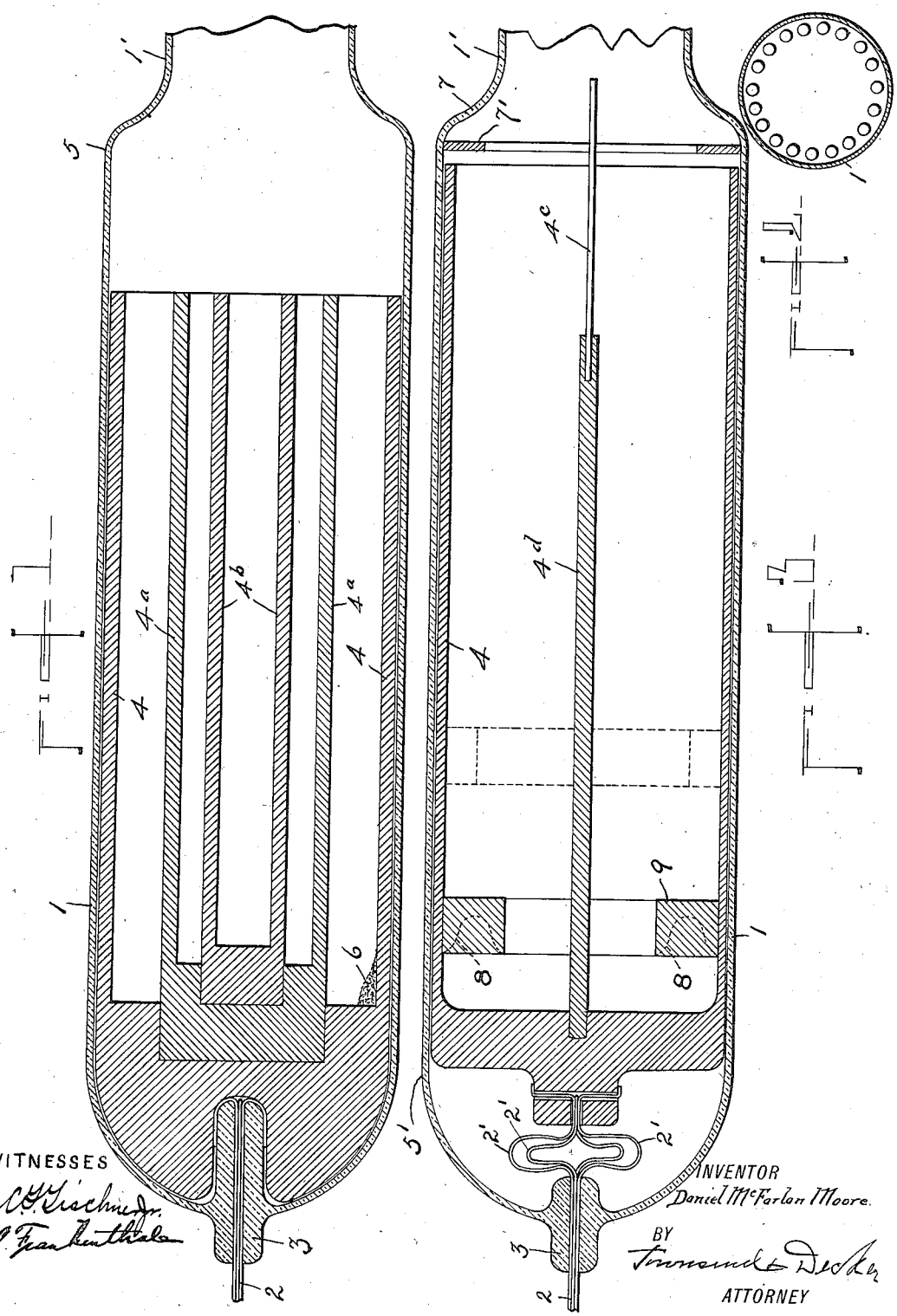

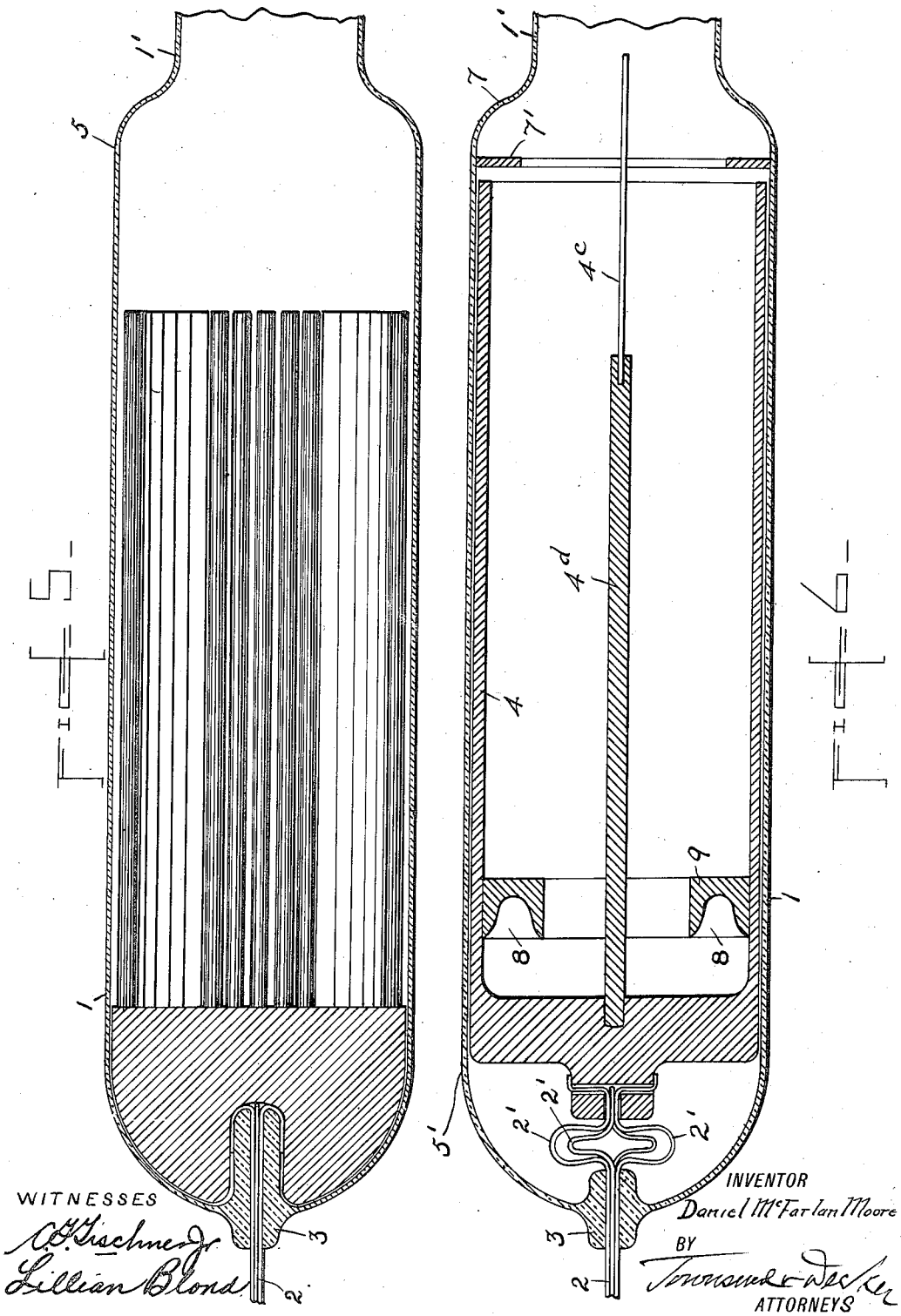

UNITED STATES PATENT OFFICE.

DANIEL McFARLAN MOORE, OF NEWARK, NEW JERSEY, ASSIGNOR TO GENERAL ELECTRIC COMPANY, A CORPORATION OF NEW YORK.

VACUUM-TUBE LAMP.

1,046,004.     Specification of Letters Patent.     Patented Dec. 3, 1912.

Application filed January 5, 1905. Serial No. 239,726.

*To all whom it may concern:*

Be it known that I, DANIEL MCFARLAN MOORE, a citizen of the United States, and a resident of Newark, in the county of Essex and State of New Jersey, with post-office address 52 Lawrence street, have invented certain new and useful Improvements in Vacuum-Tube Lamps, of which the following is a specification.

My present invention relates to that class of devices employed for lighting and other purposes, and known as vacuum tubes, and comprising essentially a sealed receptacle containing a rarefied air or other gas through which electric energy is passed for the purpose of rendering the contents of the receptacle luminous, or for other purposes.

My invention is intended for use in that class of tubes in which the electric energy is transferred to the contents of the tube by internal or sealed electrodes, and relates primarily to a construction of electrode specially suitable for tubes containing a chemical or organic substance which becomes the agent in the production of or restoration of the contained gases and in so doing acts to increase the life of the lamp, give steadiness to the light and secure other advantages.

One part of my invention relates to the constitution of the electrode and consists essentially in the use of a porous conducting material for said electrode impregnated with a chemical substance which, by electrolytic action, releases an element suitable for use as the rarefied gas or vapor within the tube or as an agent in a catalytic action useful in restoring the gases to effective condition. In my application filed Sept. 2, 1903, No. 171,587, Patent #1,020,109, issued March 12, 1912, I have described the use of such a chemical substance, stating that preferably I employ an organic substance or one containing carbon as an element or capable of furnishing carbon monoxid or dioxid.

In the present application I describe specifically the use of shellac but it is to be understood that I do not limit myself to the use of such material.

In carrying out my present invention, I preferably use some form of carbon as the conducting material of which the electrode is composed and of the carbons I prefer to employ graphite. Such conductor may be impregnated with the chemical or organic substance in any desired way, as, for instance, by dissolving the same in alcohol and painting the electrode with the solution, or the chemical such as shellac may be incorporated with the graphite or other conductor in the process of manufacturing such electrode from the powdered conductor, by making a plastic mass of the shellac and graphite and then forming or molding to the desired shape for the electrode, according to the usual process of manufacturing articles composed mainly of carbon.

When the chemical is of such nature that it will flow readily when heated to the proper degree, as in the case of shellac, it may be incorporated or combined with the electrode by flowing it in a heated condition over the surface of said electrode. To do this it is only necessary to place the shellac in dry form upon the surface of the electrode and heat the latter so that the shellac will be reduced to a fluid condition, after which the same may be caused to flow over the surface and form a hard glaze. The advantage of this is that the chemical becomes firmly attached to the electrode and is not liable to become disintegrated during operation of the lamp. A further advantage is that by melting the shellac, the foreign gases are driven off and are, therefore, not present after the lamp is sealed up, and do not have to be removed by the exhausting process. For this reason this method of applying the chemical is preferable to that in which the shellac is applied in a solution of alcohol or other solvent, and allowed to dry, in which case there is necessarily present material capable of evolving foreign gases, which have to be removed by the exhausting process.

My invention relates further to the form or construction of the electrode and to the means for preventing the discharge from the working down to the leading-in wire, for avoiding undue heating of the electrode at its forward end or edge and for other purposes as hereinafter more particularly set forth.

My invention relates also to the means for forming an electric connection between the internal electrode and the leading in wire and consists essentially in providing the electrode with a cavity in which one or more extensions of the leading in wire are clamped between the inner wall of said cavity and the outside of the stud through which the leading in wire passes.

Figure 1 of the accompanying drawings shows in longitudinal section one end of a vacuum tube lamp embodying my invention. Fig. 2 shows a modification of a detail. Fig. 3 shows another form of electrode and tube. Fig. 4 shows a modified form of electrode. Fig. 5 is a side elevation showing the apparatus with an electrode composed of rods. Fig. 6 is a sectional elevation of Fig. 3 on a line to show the recesses in the bottom of the electrode.

1 is the glass tube, and 2 is the leading in wire extending through the glass stud or seal 3 in the end of said tube for union with the electrode. The latter is made of a number of concentric cups or cylinders 4, $4^a$, $4^b$, which are united in any suitable way at their bases, as, for instance, by nesting one within another as shown and one or more of the cylinders may, if desired, be formed of a stockade of small rods or pieces as indicated in Fig. 5. The outer portion 4 of the electrode practically fills the bore of the tube. The advantages of this form of tube are that by affording a large surface area the wattage is well distributed and the heat is kept well away from the wall of the lamp, since the central portion of the electrode is that which becomes highly heated during operation. It thus becomes possible to use in the outer spaces of the electrode chemicals of a character which it would be impracticable to use at the center because they would become almost immediately fused and carbonized.

As shown in Figs. 1 and 5 the connection between the leading in wire 2 and the electrode 4 is made by forming a cavity in the base of cylinder or cup 4 in line with the stud or stem 3, and of a diameter to fit said stem more or less closely and pressing the electrode down over the projection 3. The leading in wire which consists preferably of a number of strands has its end or ends bent down over the side of the stem so as to be clamped firmly in contact with the electrode when the latter is forced down upon the stud. This insures a good electrical connection between the leading in wire and the electrodes and facilitates the manufacture of the lamp, since it is possible by using this form of connection to manufacture the tube 1 with the stem 3 and leading in wires complete, and then to insert the electrodes and by firmly pressing it down into place establish the desired electrical connection between the leading in wire and the electrode. This applies to the construction of the end portion of the tube which is subsequently sealed to the main or light giving portion 1' at the point indicated by the numeral 5.

The shellac or other material when applied as a paint which will soak into and impregnate the electrode of carbon graphite or other solid conducting material may be applied over the whole exposed surface of the electrodes consisting of the cup or cylinders 4, $4^a$, $4^b$, or, if desired, may be applied only to a portion of the surface of one or more cups or cylinders. Also, said organic substance or shellac or compound comprising carbon, hydrogen and oxygen only may be put in as a loose powder, as indicated at the point 6. When the tube is run the central portion of the electrode becomes highly heated and ordinarily of such temperature as to make it impracticable to apply the organic substance at the central portions. By using, however, exterior cylinders or cups, as shown, which are less highly heated, I make it possible to employ substances which would volatilize at the high temperatures of the central portion.

The improved electrodes shown, may, obviously, be modified by dispensing with the central electrodes or portion thereof $4^a$, $4^b$ and I find in practice that by using a single cylinder or cup of graphite excellent results may be obtained.

Hitherto, in the operation of this class of devices, great difficulty has been experienced from the tendency of the discharge to work down to the bottom or end of the tube and to attack and destroy the junction between the leading in wire and the electrode. I have found that by making the electrode sufficiently long, that is to say, by providing it with a forward extension of sufficient length this tendency can be avoided and that the discharge will confine itself to the electrode proper, any discharge tending to flow to the base of the electrode and attack the leading-in wire and connections being practically short-circuited by such forward extension.

While I have described the application of a coating of the desired chemical to the whole electrode, it is obvious that one part of the electrode, as, for instance, the cylinder 4, may be uncoated and that the organic substance or gas-evolving material may be inserted in the form of a powder, as at 6, near the base of the electrode, so that the gases in passing to the tube will be subjected to thorough ionization by circulating past the forward extension of the electrode. When the electrode is thus used, I prefer to employ graphite for the cup or cylinder.

My improved electrode is applicable to tubes whether run by continuous or alternating or rapidly varying currents and may be employed either as the anode or cathode.

It is especially useful, however, as a cathode and for a tube in which the volume of exciting current is not sufficient to produce disintegration of the electrode. The central portion of the electrode, instead of being formed of a number of cups or cylinders, may consist of a single rod as illustrated in Figs. 3 and 6. In these figures is shown a construction designed to overcome the tendency of the current to concentrate or flow in excessive amount to or from the forward edge of the electrode, which tendency or excessive flow frequently results in breaking the glass of the lamp. This I accomplish by forming the electrode with an internal diameter which is greater than that of the main or light giving portion 1', through which the discharge passes to reach the electrode, in which case the forward edge of electrode 4 lies behind a shoulder 7, joining the portions 5' and 1' of the tube. By this means the discharge is directed or confined to the spaces entirely within the electrode 4, and is caused to distribute itself over the entire surface thereof, thus preventing, to a great extent, the localization of heating effects in the electrode, and securing a more uniform temperature thereof. This is of itself desirable, independently of the fact that the fracture of the tube by excessive heating at one point is avoided. It is obvious that in carrying out this part of my invention the said shoulder or off-set might consist of a supplemental ring or shield 7' of annular form located in the larger portion 1 and projecting inwardly, as shown in front of the forward edge of the electrode 4. The portion $4^c$ constitutes the more highly heated portion of the electrode when employed as a cathode. Said rod may consist of a thin piece of carbon mounted in the end of the larger rod $4^d$ projecting from the base of the electrode proper. Said part $4^d$ might, however, be of other material and the electrode connection be run through the same to the end of the rod $4^c$ which sets in the end of $4^d$. In this class of devices, considerable difficulty is experienced when the electrode is employed as a cathode from the extreme heating of the part which directly receives the discharge. At the same time it is desirable that said part should maintain a high temperature in order to reduce the difference of potential between the same and the gas. By the construction shown I am able to regulate the temperature of the part $4^c$ and keep the same down to proper limits since the exterior portion 4 of the electrode receives a part of the discharge while, at the same time, permitting the central portion to be properly heated. When the gas-evolving material is employed the same may, as already described, be applied as a coating to the electrode 4 or incorporated therewith or may be placed loosely within the electrode, but at the point where it will not be exposed to very great heating, especially when it is of a character which would readily fuse or carbonize under the high temperatures which exist in the lamp when in operation. Such substances may be located, if desired, in a cavity 8 formed at the rear of a ring or collar 9 inserted within the electrode 4, and located preferably near the base thereof. As will be obvious, the material located in said cavity is protected from the direct action of the discharge while, at the same time, the gas or gases evolved therefrom are compelled to circulate through spaces where they will be thoroughly ionized before passing to the light giving portion 1'.

The form of electrode shown is particularly useful for tubes run with alternating currents since the part 4, which runs at a lower temperature, can operate readily as an anode, while the part $4^c$, being highly heated, can readily operate as a cathode.

Fig. 3 shows also a modification in the manner of forming connection between the electrode and the leading in wire. The latter passes, as before, through the stud 3 and the inner end thereof is joined to a number of flexible conductors 2', which, in turn, are united in any suitable manner with the base of the electrode 4, as, for instance, by passing them through an axial opening and out through radial openings in a projection, extending rearwardly from the base of the electrode. These flexible connections facilitate the process of manufacture since, by the use of them, it is possible to insert the electrodes and attach the same to the leading in wire after the base portion of the tube 1 has been constructed. In this instance a joint would be formed in the tube 1 at a point 5' and the main portion of the tube 1 would be joined at 5' to the base portion after attachment of the electrode to the wires 2'. The latter, as will be obvious, form in effect flexible extensions to the leading in wire.

The employment of one or more rings or collars with its central opening, has the advantage that it obstructs the free passage of the chemicals into the main or light giving portion of the tube, and prevents soiling of the latter.

In Fig. 4 is shown a form of electrode constructed to focus the discharge upon the part which maintains a high temperature in order to produce difference of potential between the same and the gas. As shown in this figure, the portion 4 of the electrode is formed at its base with the curved surface 4' and the portion $4^c$, which is to be maintained at a high temperature, is located in the focus of the curved base.

The special means herein described for preventing undue heating of the forward edge of the electrode and for preventing the discharge from working down into the leading-in wire are not herein claimed as they form the subject of another application for patent filed by me Dec. 26th, 1906, S. N. 349,548.

What I claim as my invention is:

1. An internal electrode vacuum tube having an interior non-arcing electrode of porous material impregnated with a readily vaporizable organic substance.

2. An internal electrode vacuum tube having an internal non-arcing electrode of porous carbon impregnated with readily vaporizable organic substance.

3. An internal electrode vacuum tube having an internal non-arcing electrode composed of a solid non-vaporizing porous and conducting substance impregnated with a vaporizable substance.

4. An internal electrode vacuum tube having an internal non-arcing electrode consisting of a porous conducting substance impregnated with shellac.

5. An internal electrode vacuum tube having an internal non-arcing electrode of porous carbon impregnated with a gum.

6. In a vacuum tube, an internal electrode having a central portion carrying a major part of the current and constituting the highly heated portion of said electrode, and an exterior part out of the direct path of the current provided with a readily vaporizable organic chemical substance, as and for the purpose described.

7. The combination in an internal electrode vacuum tube, of an electrode provided with a cavity, a leading-in wire, a stud through which the wire passes and an extension or extensions of said wire clamped between the stud and inner wall of the cavity.

8. In an electrically operated vacuum tube, a molded non-arcing electrode comprising carbon and material capable of furnishing a gas suitable for use in the tube.

9. In an electrically operated vacuum tube, a molded non-arcing electrode composed of graphite and containing a compound of oxygen, hydrogen and carbon.

Signed at New York, in the county of New York and State of New York, this 30th day of December, A. D. 1904.

DANIEL McFARLAN MOORE.

Witnesses:
C. F. TISCHNER, Jr.,
EDWARD COLE.